Figure 1:
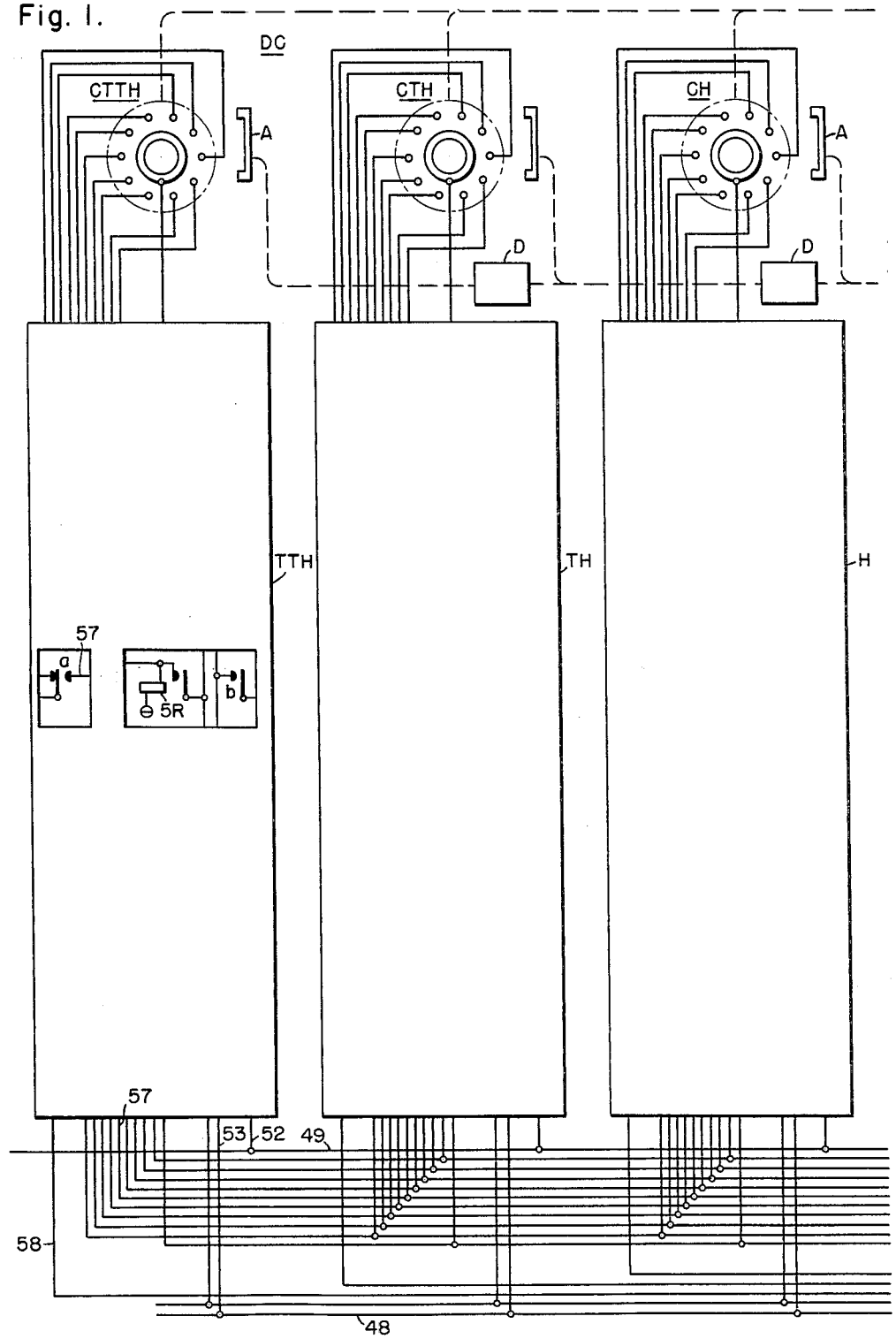

July 18, 1961 W. A. DERR ET AL 2,993,194
REMOTE METERING APPARATUS AND SYSTEM
Filed Nov. 14, 1956 6 Sheets-Sheet 6

United States Patent Office 2,993,194
Patented July 18, 1961

2,993,194
REMOTE METERING APPARATUS AND SYSTEM
Willard A. Derr, Pittsburgh, and Weldon L. Metz, Penn Township, Allegheny County, Pa., assignors to Westinghouse Electric Corporation, East Pittsburgh, Pa., a corporation of Pennsylvania
Filed Nov. 14, 1956, Ser. No. 622,057
3 Claims. (Cl. 340—150)

Our invention relates generally to metering, and has reference in particular to remote metering apparatus.

Generally stated, it is an object of our invention to provide in a simple and effective manner for obtaining an integrated indication of a metered quantity at a remote location.

More specifically, it is an object of our invention to provide for obtaining on-call indications of an integrated reading of a fluid flow meter from a remote location.

Another object of our invention is to provide for using a digital converter in conjunction with a relay register for obtaining integrated readings of an analog quantity when desired, and for operating counting means in conjunction with the register to transmit a reading of the integrated value of the analog quantity.

It is also an object of our invention to provide in a remote metering system for selecting a predetermined remote station by means of coded signals and for operating a digital converter at the station to effect transmission of an integrated reading of an analog quantity measured at the station.

Yet another object of our invention is to provide for remote metering of integrated quantities by metering means which provide both a coded reading of a quantity to be metered and an identification code for the station at which the reading originates.

It is also an object of our invention to provide in a remote metering system for transmitting a selection code to select a particular metering location and for transmitting from such location in response to said code both a metering code and a code identifying the metering location.

Other objects will, in part, be obvious and will, in part, be explained hereinafter.

In practicing our invention in accordance with one of its embodiments, a counting circuit at a dispatching office is operable to control a sending relay which transmits a selection code to a remote metering station where receipt of the code operates a read-out relay to connect a digital converter driven by a fluid flow meter to a register circuit, for operating it in accordance with the integrated shaft revolutions of the meter. A counting circuit at the remote station is thereby activated to operate a sending relay to transmit a station identification code. The counting circuit is then sequentially connected to the several different circuits of the register to effect operation of the sending relay in accordance with the particular readings thereof. At the dispatching office a printer having a plurality of registers is operated by the incoming identification and metering codes to record the station identification and metering codes in order.

Figure 5:
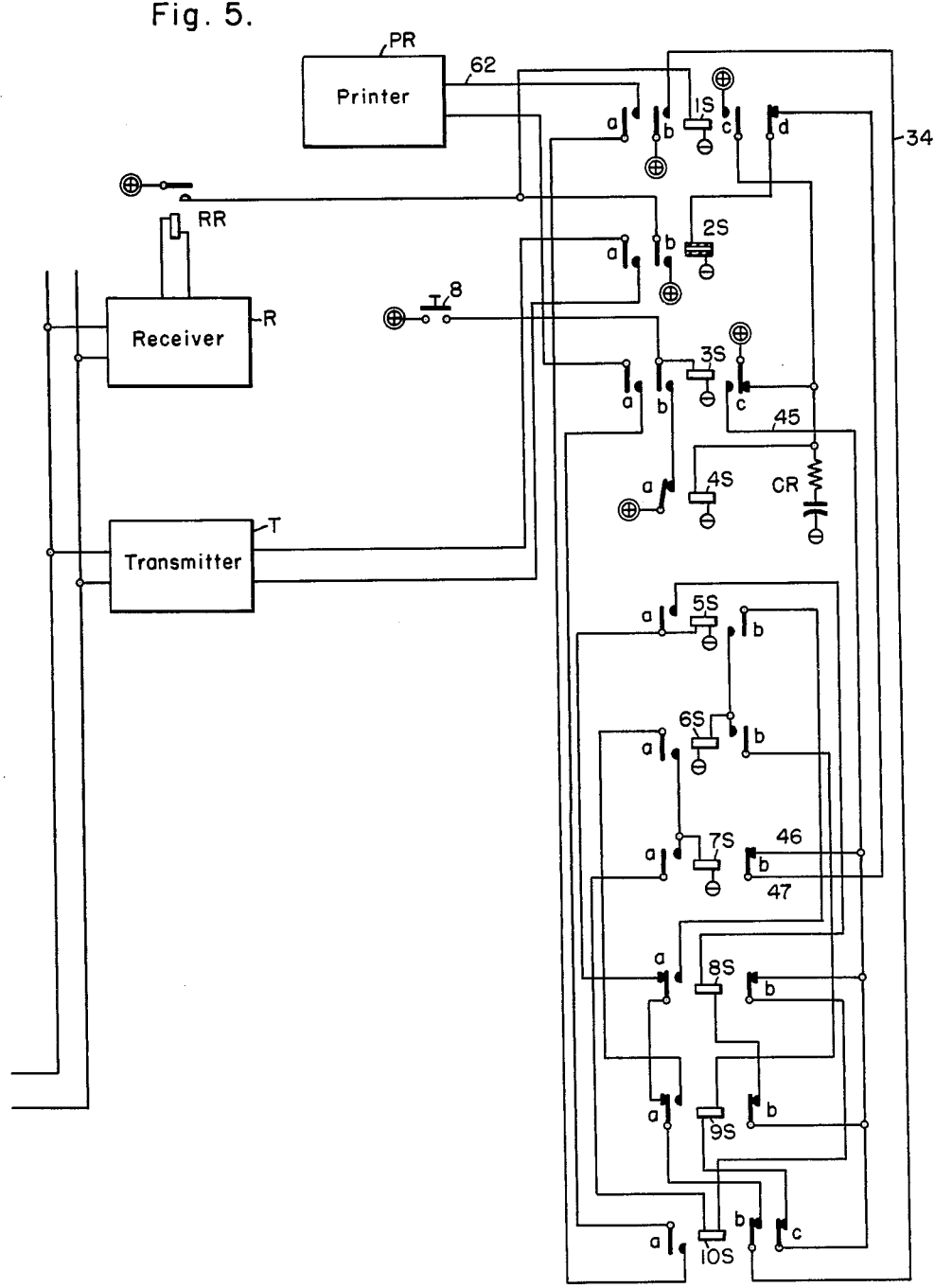
Figure 6:
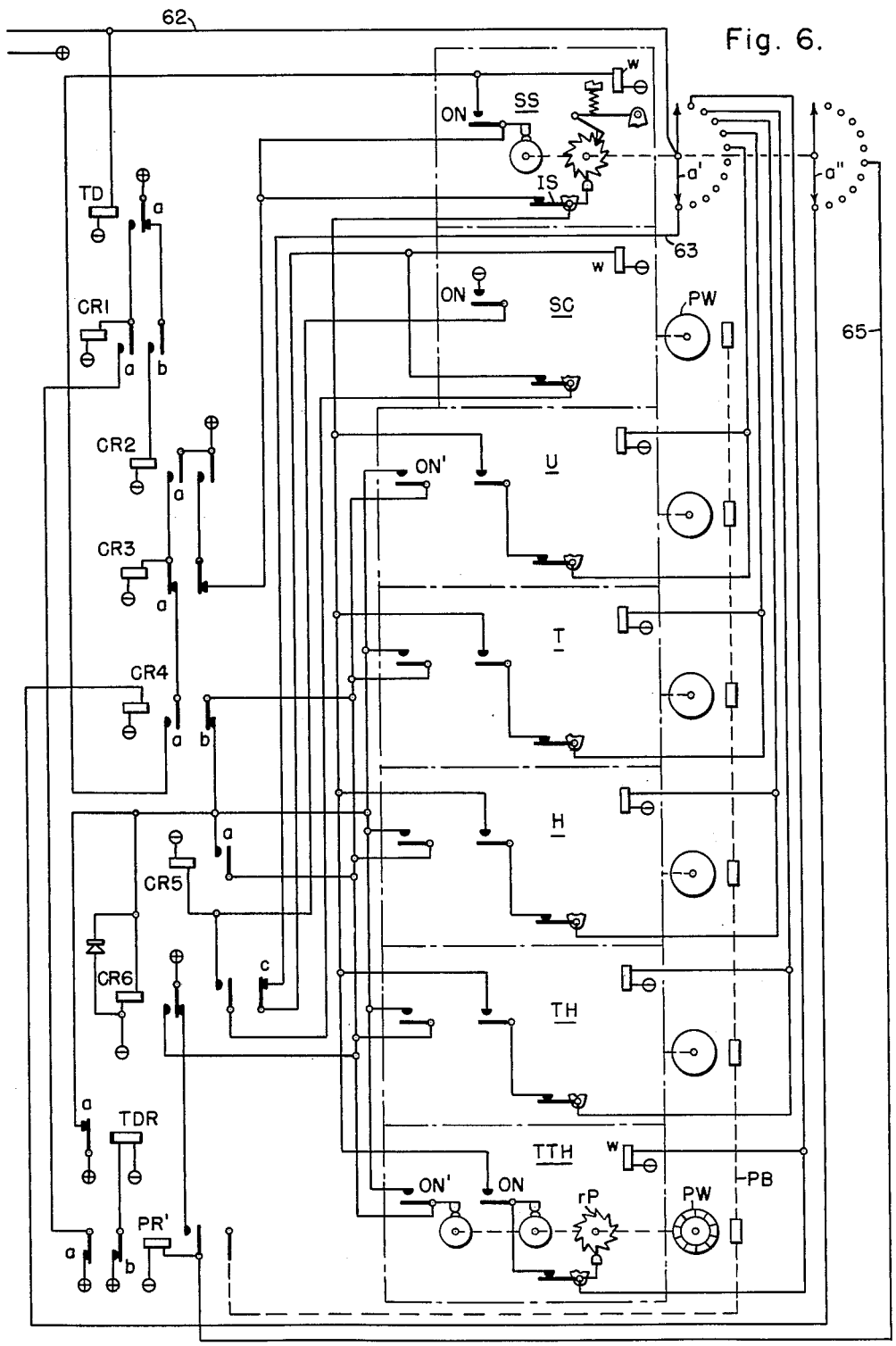

For a more complete understanding of the nature and scope of our invention, reference may be made to the following detailed description and the accompanying drawings in which:

FIGS. 1 through 4 arranged in that order from left to right are a schematic diagram of metering apparatus at a remote station in a metering system embodying the invention in one of its forms;

FIG. 5 is a schematic diagram of the metering apparatus at a dispatching office in the system; and FIG. 6 is a detailed schematic diagram of the printer shown in FIG. 5.

Referring generally to FIGS. 1 through 5, it will be seen that a digital converter DC at a remote metering station is connected to be driven by the shaft S of a fluid flow meter M in a pipe P for effecting on-call operation of a plurality of register circuits U, T, H, TH and TTH for recording the integrated reading of the meter M in units, tens, hundreds, thousands and ten thousands, respectively. A common counting circuit 12 is provided in conjunction with the transfer means 20 for sequential connection to the register circuits for operating a keying relay 5 which keys a tone transmitter T1 for transmitting signals over a signaling channel comprising conductors L1 and L2 to be received by a receiver R at a dispatching office for operating a printer PR through a receiving relay RR. The counting circuit 12 is used to control the keying relay 5 to send a station identification code which is followed by a metering code depending on the readings of the different registers.

Selection of the particular station is determined by operating a pushbutton 8 at the dispatching office to effect operation of a keying relay 2S under the control of counting relays 5S, 6S and 7S in conjunction with their respective sequence relays 8S, 9S and 10S. The sending relay 2S is thus operated to transmit a code of three pulses through the transmitter T which are received by a receiver R1 at the remote station where a selection circuit of counting relays 5SR, 6SR and 7SR with their respective sequence relays 8SR, 9SR and 10SR effect operation of a read-out control relay 2 to energize the read-out solenoid or relay RO of the digital converter for operating the register circuits to obtain a metering reading.

Figure 2:
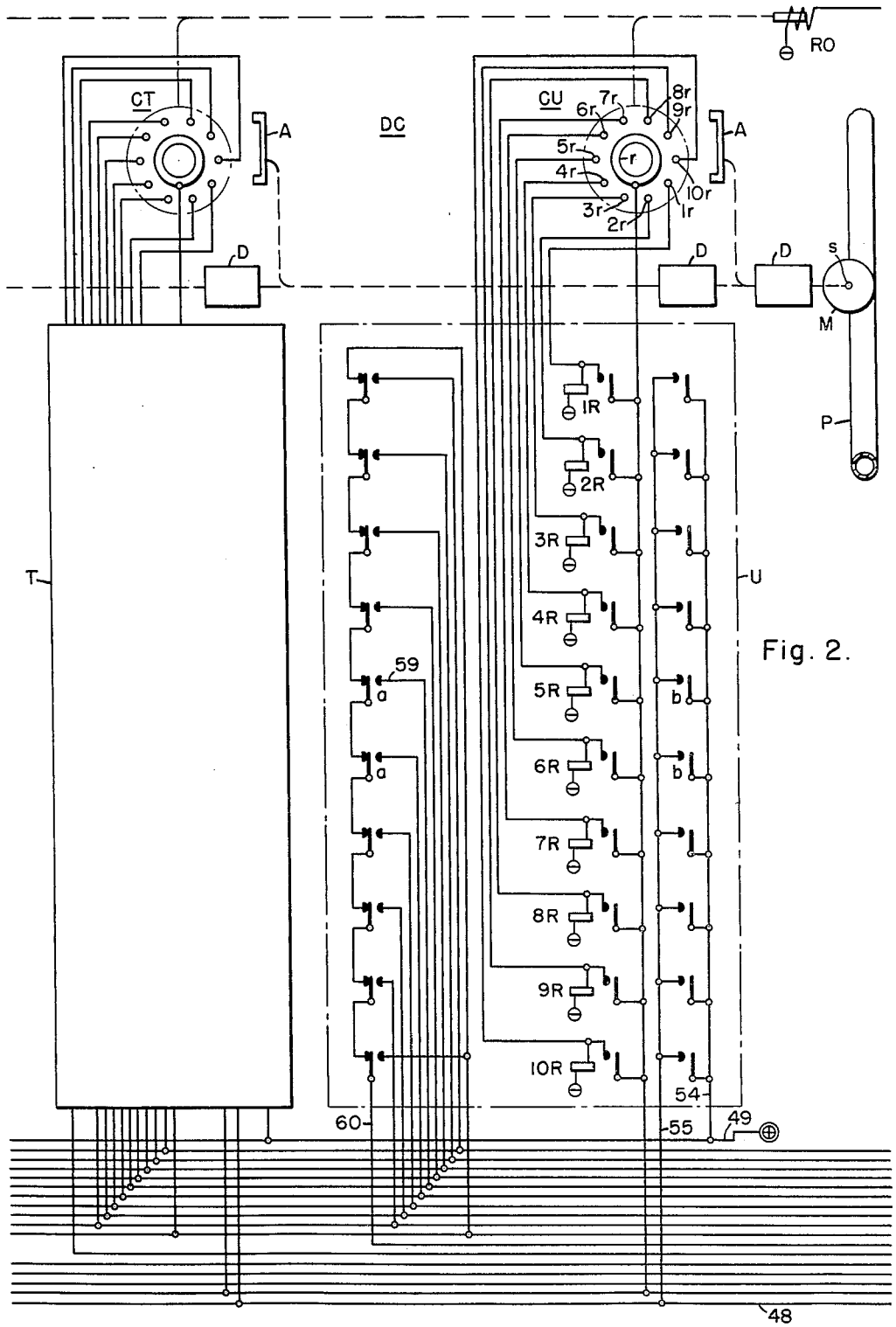

Referring particularly to FIGS. 1 and 2, it will be seen that each of the register circuits, for example the register circuit U, comprises a plurality of register relays 1R through 10R which are arranged to be selectively energized from an associated contact plate, in this instance contact plate CU of the digital converter, in response to operation of the read-out relay RO. The contact plate CU, for example, has a plurality of stationary contacts 1r through 10r which are connected to the relays 1R through 10R, respectively. A rotating contact arm A is provided, which is axially spaced from the contact plate but which is disposed to bridge between a stationary contact ring r and a different one of the contacts 1r through 10r, depending upon the rotational position of the contact arm A. The arm A of the contact plate CU is driven from the shaft S of flow meter M through a drive unit D which advances the arm from one contact to the next for each complete revolution of the meter. The contact arm A of the tens unit CT is driven through an additional drive unit D so that it advances from one contact to the next for each complete revolution of the contact arm A of contact plate CU. Likewise, the contact arms A of the hundreds, thousands and ten thousands contact plates CH, CTH and CTTH are connected in cascade through similar drive units D, so that each arm A is advanced one position for a complete revolution of the arm A of the preceding unit. The read-out relay RO is disposed to actuate the contact plates CU, CT, CH, CTH and CTTH to effect engagement with the respective contact arms A.

Figure 3:
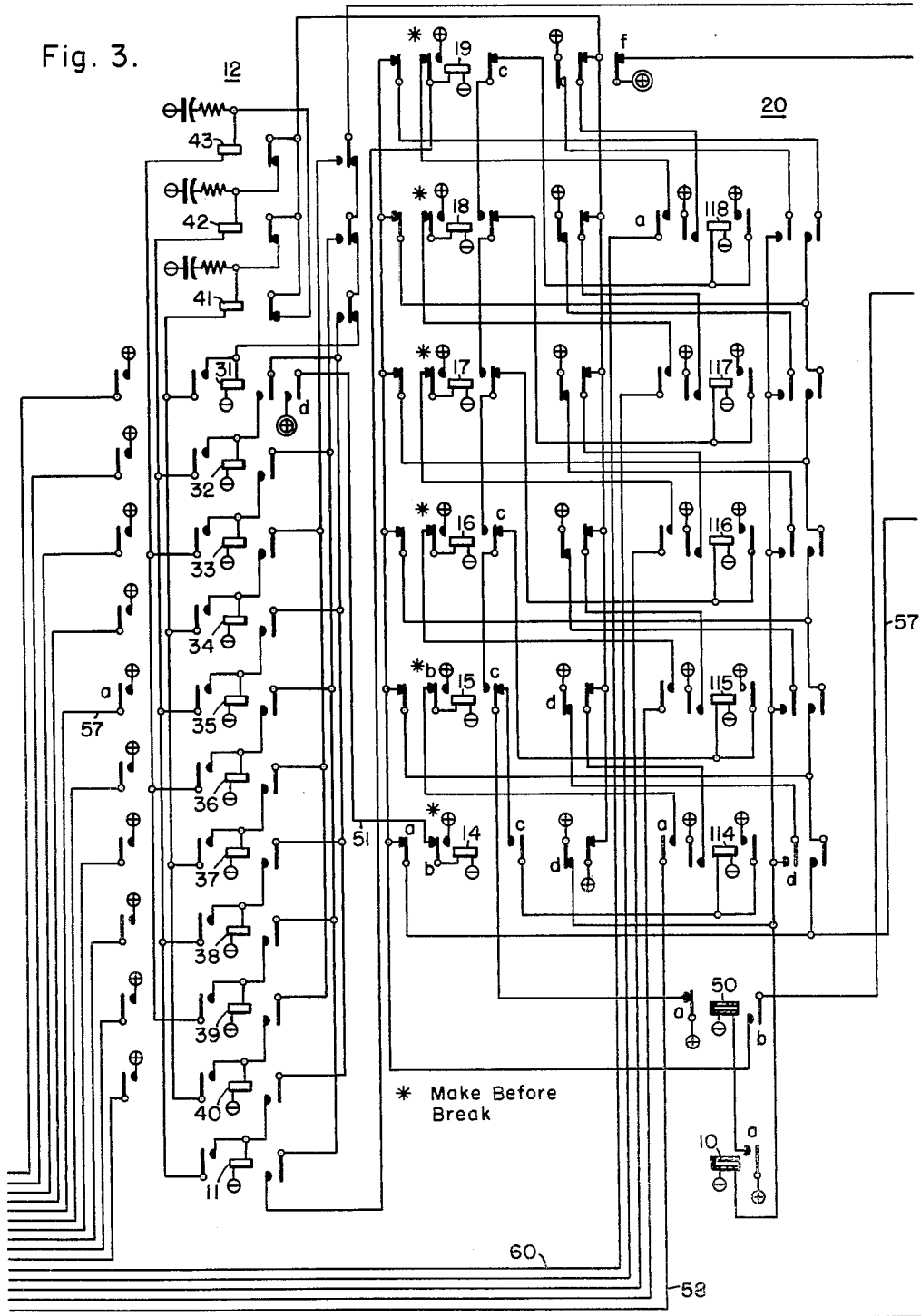

The transfer means 20 comprises, as shown in FIG. 3, a station code stop relay 14 which stops the keying relay 5 at the end of the station identification code, and a start relay 114 which connects the counting circuit 12 in circuit with the register TTH to start operation of the keying relay to transmit pulses in accordance with the reading of that register. A stop relay 15 is provided for disconnecting the counting means 12 from the register TTH when its reading has been transmitted, and a start relay 115 then connects the counting chain to the register TH for transmitting a code in accordance with its reading. A stop relay 16 disconnects the coding circuit 12 when a reading of the thousands register has been transmitted, and a start relay 116 then connects the counting circuit 12 to the hundreds register 14. Stop relays 17, 18 and 19 operate to disconnect the counting means 12 from the hundreds, tens and units registers, while start relays 117 and 118 reconnect the counting circuit 12 to the tens and units registers in sequence. Time delay relays 10 and 50 are provided for effecting operation of the transfer relays at the end of each code of pulses.

The counting means 12 comprises a chain of counting relays 31 through 40 operating in the usual manner with associated sequence relays 41, 42 and 43 in response to operation of the pulse drive relay 1 so that relay 31 is energized on the first pulse sent or received, then relay 41 energizes in series with relay 31. Relay 32 is energized with the next pulse and then relay 42 in series therewith, down the line to relay 11 which is an overcount relay which operates when an extra pulse is sent for some reason or other, to reset the equipment.

Figure 4:
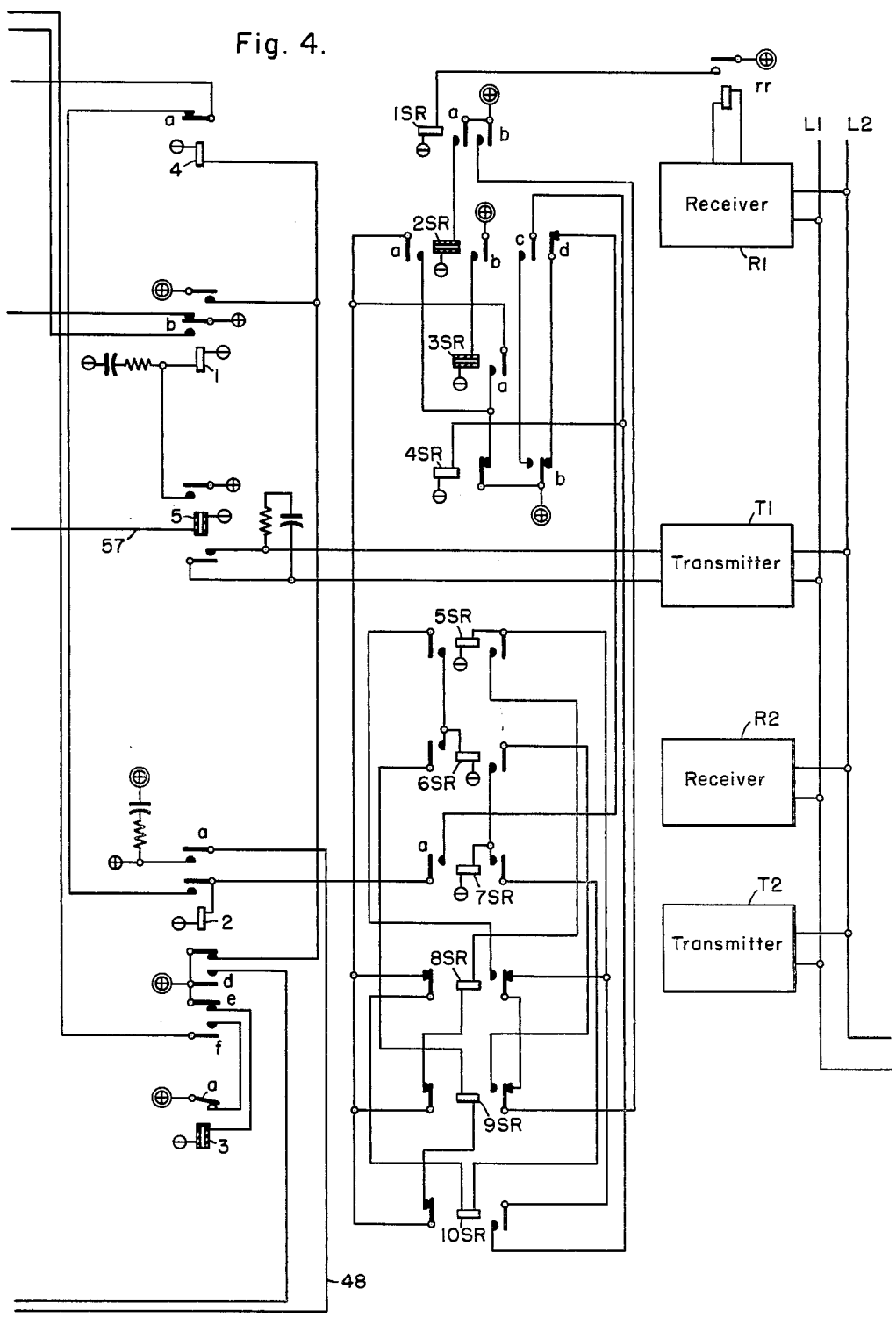

As shown in FIG. 4, selection relays 5SR, 6SR and 7SR are utilized, together with their respective sequence relays 8SR, 9SR and 10SR in the usual counting chain manner, to check the selection code for the particular station and effect operation of the read-out control relay 2. Relay 1SR operates in response to incoming pulses from receiver R1 to effect operation of the selection relays. Relay 2SR operates in conjunction with relays 1SR and 3SR to detect the end of the selection code. Relay 4S is a reset relay which resets the equipment at the termination of the last incoming code of pulses. Other remote stations may be connected to the same signal channel, by means such as transmitter T2 and receiver R2, having equipment responding to different selection codes. A read-out control relay 2 is provided for effecting operation of the read-out solenoid RO under the control of the telemetering selection relays 5SR, 6SR and 7SR. An auxiliary read-out control relay 3 of the delay type operates in conjunction with the relay 2. An auxiliary keying relay 1 operates in conjunction with the keying relay 5 to provide for keying the transmitter T1 to transmit the readings of the different registers. A reset relay 4 is provided for resetting the equipment at the end of the last code of pulses transmitted.

Referring to FIG. 6, it will be seen that the printer PR comprises a plurality of registers SC, U, T, H, TH and TTH which are sequentially operated under the control of a stepping switch SS to record the station identification code, and the units, tens, hundreds, thousands, and ten thousands figures of the metering reading respectively.

The stepping switch SS may be of a well known type having contact arms $a'$ and $a''$ actuated by a ratchet and pawl mechanism $rp$ operated by a solenoid $w$. An off-normal switch ON and an interrupter switch IS are connected in circuit with the solenoid $w$ for operating the stepping switch in a manner to be hereinafter described.

A time delay relay TD having a delayed dropout, and a plurality of control relays CR1 through CR3 are provided for stepping the switch SS to successively connect the registers for operation in response to incoming codes of pulses. Control relays CR4, CR5 and CR6 are provided for resetting the stepping switch and registers after a metering reading is obtained.

The registers each have a register or print wheel $pw$ operated by a ratchet and pawl mechanism $rp$ similar to that of the stepping switch SS. The station counter has an off-normal switch ON and an interrupter switch IS, similar to those of the stepping switch SS, while the registers have two off-normal switches ON and ON', ON' being connected in a holding circuit for control relay CR6 for maintaining reset circuits for the registers.

A print relay PR is provided for operating a print bar PB in connection with the print wheels for recording a reading on a tape or chart (not shown). Reset is effected at the end of a printing operation by means such as a delay relay TDR which establishes a circuit for the reset control relay CR6.

To obtain a reading of the shaft revolutions or flow from the remote station, the pushbutton 8 at the dispatching office is momentarily operated. This results in selection relay 3S being energized and sealed in through armature $b$ of relay 3S and armature $a$ of relay 4S. Armature $c$ of relay 3S energizes slow-to-release relay 2S through a circuit extending from positive through armature $c$ and its front contact, conductor 45, conductor 46, back contact and armature $b$ of relay 7S, conductor 47, back contact and armature $d$ of relay 1S, to the operating winding of relay 2S. Relay 2S keys the tone transmitter T through armature $a$ to transmit a pulse to the remote station over the signal channel. Relay 1S is energized through armature $b$ of relay 2S, while relay 5S is energized through armature $b$ of relay 1S, conductor 34 through armature $b$ and back contact of relay 10S, armature $a$ and back contact of relay 9S, armature $a$ and back contact of relay 8S. A break contact of relay 1S opens the circuit to the operating winding of relay 2S at armature $d$ so that relay 2S releases after a short time delay. Release of relay 2S removes the pulse from the channel and allows sequence relay 8S to be energized in series with relay 5S. Release of relay 2S also causes relay 1S to release and the release of relay 1S allows relay 2S to be again energized. This second energization of relay 2S results in a second pulse being transmitted to the remote station. Energization of relay 2S again energizes relay 1S which interrupts the circuit to relay 2S. Three pulses are thus transmitted and at the termination of the third pulse sequence relay 10S energizes in series with relay 7S, setting up a circuit to the printer P through armature $a$ of relay 3S, armature $a$ of relay 10S. This circuit is maintained so long as relay 4S remains energized, release of relay 4S being delayed by a capacitor-resistor combination CR.

The three pulses transmitted from the dispatching office by transmitter T are received by the receiver R1 at the remote station and result in operation of the receiving relay $rr$ thereof. This operates the selection relay 1SR three times to effect operation of the counting relays 5SR, 6SR and 7SR in conjunction with their sequence relays 8SR, 9SR and 10SR, respectively. The delay relay 2SR is energized through armature $a$ of relay 1SR and remains energized between pulses. At the end of the third pulse, relay 2SR releases and establishes a circuit to the read-out control relay 2 through armature $a$ and front contact of relay 7SR, back contact and armature $d$ of relay 2SR and back contact and armature $b$ of relay 4SR. This is a momentary circuit, since relay 3SR is deenergized upon release of relay 2SR and after a time delay releases to effect deenergization of relays 7SR and 10SR to restore the selection counting relays to a normal deenergized position.

Relay 2 seals itself in through its armature $b$ and back contact and armature $a$ of relay 4 and back contact and armature $f$ of the stop relay 19. An energizing circuit is provided for the read-out relay RO of the digital converter DC through armature $f$ and front contact of relay 2 and armature $a$ and back contact of relay 3. The solenoid RO is momentarily energized during the delay period of relay 3, which is deenergized at armature $e$ of relay 2. Energization of the solenoid RO moves the contact plates CU, CT, CH, CTH and CTTH axially so as to effect engagement of contact arms A of the digital converter into engagement with a particular one of the stationary contacts of its respective contact plate to energize one of the register relays 1R through 10R. These relays seal themselves in through armature $d$ of relay 2. When any one of the register relays is energized, the indirect positive bus 48 is energized from the direct positive bus 49 through conductors 52 and 53 as well as conductors 54 and 55 through armature $b$ of, for example, register relays 5R, of the ten thousands register, and the units register U, which it will be assumed was energized upon contact of the arm A with the contact plates CTTH and CU. Relay 10 is energized as soon as direct positive is connected to the indirect positive bus 48, since indirect positive is applied through armature *a* of relay 2 to all terminals bearing the plus designation within a single circle. Relay 10 is thereupon energized through armature *d* of relay 14. An energizing circuit is provided for the time delay relay 50 through armature *a* of relay 10 and completes a circuit for the keying relay 5 through conductor 57, armature *a* of relay 14 and armature *b* of relay 50 to positive at armature *b* of relay 1. Relays 1 and 5 operate in sequence to cause pulses to be transmitted. These pulses are applied to the counting circuit 12 at armature *b* and back contact of relay 1, so that counting relay 31 operates with the first pulse. This applies positive to the stop relay 14 from armature *d* of relay 31 through conductor 51 and armature *b* of relay 14, through its make-before-break contacts. By connecting conductor 51 to positive at the armature *d* of another of the relays 31 through 38, the station code will be varied according to which relay the connection is made. When relay 14 operates, the circuit for relay 10 is interrupted at armature *d* causing deenergization of relay 50 and interrupting the energizing circuit for the keying relay 5. By connecting positive to relay 14 at the armatures *d* of other of the counting relays 31 through 40, different station codes may be provided.

This single pulse is received by the tone receiver relay R at the dispatching office and operates receiving relay RR to effect operation of relay 1S, which transmits the pulse to the printer P. Operation of relay 1S prevents delay relay 4S from returning to the deenergized position.

When the stop relay 14 is energized at the remote station, relay 10 is deenergized and, in turn, deenergizes relay 50. Deenergization of relay 50 completes an energizing circuit for the start relay 114 from armature *a* of relay 50 through armature *c* of relay 15, armature *c* of relay 14 to relay 114. Relay 114 completes an energizing circuit for relay 10 at armature *d*, and relay 10 again energizes relay 50 to effect operation of the keying relay 5 and its drive relay 1 to transmit pulses to the dispatching office. As before, the counting means 12 is energized through armature *b* of the drive relay 1, and counting relays 31 through 40 will be energized in sequence together with their associated sequence relays 41, 42 and 43 in the well-known manner of counting chain circuits. When the fifth pulse is transmitted, relay 35 energizes and completes a circuit at armature *a* which may be traced over conductor 57, armature *a* of register relay 5R which has been assumed to be operated and then through armatures *a* of relay 6R, 7R, 8R, 9R and 10R to conductor 58 and stop relay 15, through armature *a* of relay 114 and armature *b* and make-before-break contacts of relay 15. The operation of relay 15 interrupts the energizing circuit for relay 10 at armature *d*, thus deenergizing relay 50 and stopping operation of the keying relay 5 and its drive relay 1. Upon deenergization of relay 50, an energizing circuit is provided for the start relay 115 through armature *c* of relay 16 and armature *c* of relay 15. The keying relay 5 is thereupon operated to send out pulses in a similar manner, in accordance with the reading on the register TH whereupon stop relay 16 will be energized to interrupt an energizing circuit for relay 10 and stop transmission of the thousands reading. In a like manner, the counting circuit 12 is connected to the hundreds, tens and units registers H, T and U. When five pulses, for example, are sent for the units reading, a circuit is provided from relay 35 through conductors 57 and 59, through armature *a* of relay 5R and armatures *a* of relays 6R, 7R, 8R, 9R and 10R, through conductor 60, and armature *a* of relay 118, to energize the units stop relay 19, which interrupts the energizing circuit for relay 10 at armature *c*. The holding circuit for relay 2 is interrupted at armature *f* of relay 19, causing relay 2 to release and remove direct positive at armature *a*, thus restoring the remote station equipment to normal.

At the dispatching office the first pulse received from the remote station causes relay 1S to operate, and completes an energizing circuit for the time delay relay TD at armature *a*. Relay TD is of the delayed drop-out type and remains energized between successive pulses of a particular group. At the same time that relay TD is energized, the single pulse is applied to the operating winding *w* of the station counter SC through conductor 62, contact arm *a'*, conductor 63, back contact and armature *c* of control relay CR6 to the operating winding *w*. This causes the station counter SC to advance one position, setting up the register or print wheel *pw* to the "one" position for a printing operation. The off-normal contact ON of relay SC closes and provides an energizing circuit for control relay CR5. Energization of relay TD provides an obviously energizing circuit for the control relay CR1, which locks up through its armature *a* and armature *a* of the print relay PR'.

At the end of the first series of pulses, which in this instance comprises a single pulse, a pause occurs and relay TD returns to the deenergized position. Since control relay CR1 is energized, an energizing circuit is provided for the control relay CR2 through armature *a* of relay TD and armature *b* of relay CR1, relay CR4 being energized through the stepping switch auxiliary contact *aa*. The stepping switch operating winding *w* is energized through armature *a* of relay CR4, armature *a* of relay CR3, and armature *a* of relay CR2. Since control relay CR3 is deenergized a short time after operation of relay CR2 the operating winding 2 of the stepping switch SS receives a single pulse thus causing the switch to step one position in a clockwise direction. The off-normal contacts ON of SS will now be closed, and relay CR4 will be deenergized. Relay CR3 remains operated until relay CR2 is released by operation of time delay relay TD upon receipt of the next series of pulses.

When the next series of pulses occurs, these being in accordance with the reading of the register TTH at the remote station, the pulses according to this reading (five, for example) are applied to the operating winding *w* of the ten thousands register TTH causing this register to advance to the fifth position in accordance to the number of pulses received so as to set up the print wheel *pw* of register TTH in accordance with the reading. At the end of this series of pulses the delay relay TD is again released, and the operating winding 2 of the stepping switch SS is again energized with a single pulse through the off-normal contacts ON of relay SS instead of through control relay CR4. The stepping switch advances, and the next series of pulses is thereupon applied to the thousands register TH, and the process is repeated for each series of pulses until the stepping switch reaches the sixth position. In this position an energizing circuit is provided for the print relay PR through arm *a"* and conductor 65, and the printing bar PB is actuated to cause the register wheels SCR, UR, TR, HR, THR, TTHR to print a reading giving the station identification and the integrated value of the flow meter reading at that station. At the end of the printing signal, a time delay relay TDR, which was deenergized at armature *b* of the print relay PR' returns to the deenergized position and provides an energizing circuit at armature *a* for control relay CR6 which locks up through armature *b* of relay CR4 and armature *a* of relay CR5 together with parallel circuits including off-normal contacts ON of the units, tens, hundreds, thousands and ten thousands registers. The stepping switch SS is successively stepped to the home position through its interrupter switch IS. The station counter SC and the register units U, T, H, TH and TTH are operated through their interrupter switches IS and their off-normal contacts ON, until they return to their own positions.

From the above description, it will be apparent that we have provided in a simple and effective manner for making on-call readings of the integrated value of an analog quantity at a remote station through the use of a digital converter. While the invention has been described in connection with its own selection system, and for only a single station, other selection codes and identification codes may be used in connection with other remote stations for selective operation of several units, and it may be readily utilized in conjunction with supervisory control which itself provides the necessary selective features.

Since certain changes may be made in the above-described structure and different embodiments may be made without departing from the spirit and scope thereof, it is intended that all the matter contained in the above description and shown in the accompanying drawings shall be considered as illustrative and not in a limiting sense.

We claim as our invention:

1. In remote metering apparatus, a transmitter at one station, means to key the transmitter to transmit a selection code, a register at a remote station having electroresponsive means with a plurality of different operating positions, a digital converter having rotatable contact means and a plurality of stationary contact means connected to set up different operating circuits to the register, metering means actuating the movable contact means, means including a receiver operated by the selection code to complete an operating circuit set up by the converter and operate the register to one of said positions, a transmitter at the remote station, means responsive to operation of the register to operate the transmitter to produce a station pulse code, means responsive to termination of said code connecting the register to effect operation of the transmitter to produce a metering pulse code in accordance with the operating position of the register; metering means at said one station having a plurality of counting means operable in sequence, and receiving means operated by the station pulse code and metering pulse code to operate the metering counting means in sequence.

2. In a remote metering system, pulse sending means at one station, means including counting means effecting operation of the sending means to produce a predetermined selection code of pulses, pulse receiving means at a remote station operated by the selection code, metering means at the remote station having a rotatable shaft, a digital converter having normally separated relatively movable contacts movable to set up distinct circuits in accordance with the shaft revolutions, means operated by the pulse receiving means to complete the circuit set up, a register having electroresponsive means operated to different counting conditions depending on the circuit completed, counting means, pulse sending means at the remote station, means including the counting means and means responsive to operation of the electroresponsive means effecting operation of the sending means at the remote station to produce a predetermined station pulse code, means including the electroresponsive means and the counting means effecting operation of the sending means after said station pulse code to send pulses in accordance with the counting condition of the register, and metering receiving means at the one station having counting means sequentially operated by the station pulse code and the register code.

3. In a remote metering system, means at one station operable to produce a selection code, metering means at a remote station, a register circuit at the remote station, a digital converter at the remote station driven by the metering means to set up different circuits to the register circuit depending on the operation of the metering means, read-out means at the remote station operated in response to the selection code to complete a circuit set up by the converter to operate the register, means responsive to operation of the register to produce a station identification pulse code, means responsive to the completion of said code to produce a metering code in accordance with the reading of the register, and metering means at the one station having registers sequentially operated by the station identification and metering codes.

References Cited in the file of this patent

UNITED STATES PATENTS

| | | |
|---|---|---|
| 1,600,358 | Puckett | Sept. 21, 1926 |
| 1,614,222 | White et al. | Jan. 11, 1927 |
| 2,335,755 | Haddad | Nov. 30, 1943 |
| 2,444,202 | McAlpine et al. | June 29, 1948 |
| 2,591,617 | Savino | Apr. 1, 1952 |
| 2,749,535 | Cruess | June 5, 1956 |
| 2,788,515 | Breese | Apr. 9, 1957 |